FIGURE I

Lindsay I. Griffin, Jr. INVENTOR

BY Olin B. Johnson

PATENT ATTORNEY

July 1, 1969 L. I. GRIFFIN, JR 3,453,147
PROCESS OF OPERATING FUEL CELL WITH EXCESS NAPHTHA FUEL
Filed March 16, 1966 Sheet 3 of 3

EQUILIBRIUM FLASH VAPORIZATION OF LIGHT NAPHTHA CONSISTING EQUAL VOLUMES OF $C_5, C_6$ & $C_7$ N-PARAFFINS

Lindsay I. Griffin, Jr. INVENTOR

BY Olin B. Johnson

PATENT ATTORNEY 3,453,147
PROCESS OF OPERATING FUEL CELL
WITH EXCESS NAPHTHA FUEL
Lindsay I. Griffin, Jr., Summit, N.J., assignor to Esso Research and Engineering Company, a corporation of Delaware
Continuation-in-part of application Ser. No. 103,326, Apr. 17, 1961. This application Mar. 16, 1966, Ser. No. 547,104
Int. Cl. H01m 27/30
U.S. Cl. 136—86         4 Claims This invention is a continuation-in-part of application, Ser. No. 103,326, filed Apr. 17, 1961, now abandoned.

This invention relates to the production of electrical energy by electrochemical oxidation of an organic fuel. In particular, this invention relates to a novel fuel cell system operated with a hydrocarbon fuel gas formed in situ from a feedstock admitted to such assembly as a liquid and to apparatus adapted to facilitate operation of such system.

One object of this invention is to provide a method of fuel cell operation wherein the storage and fueling advantages provided by a liquid fuel are combined in a single system with the advantages inherent in the diffusion and reaction of a fuel gas by vaporizing a liquid fuel within the fuel cell system.

A second object of this invention is to provide a method for removing the heat of reaction from a fuel cell by utilizing the heat of reaction to provide the heat of vaporization for an amount of liquid fuel in excess of that to be utilized as a reactant wherein the excess hydrocarbon gas is also utilized as a sweep gas for removing from the cell vaporous products of the cell reaction, e.g. carbon dioxide and/or water.

Another object of this invention is to provide a fuel cell process wherein a light naphtha hydrocarbon fraction boiling in the range of about 100° F. to 300° F., preferably 100° F. to 200° F., can be effectively utilized in a fuel cell structure adapted to be fueled with a petroleum gas.

These and other objects will become evident from a more detailed description of the process of this invention hereinafter set forth and from the accompanying drawings.

The unique value of the fuel cell lies in its ability to convert chemical energy to electrical energy continuously and with a greater efficiency than conventional means of power production. A fuel cell includes at least one fuel electrode (anode) and at least one oxygen electrode (cathode), an electrolyte providing ionic conductance between such electrodes, means for passing an oxidizing gas into dual contact with electrolyte and oxygen electrode, means for passing fuel into dual contact with electrolyte and fuel electrode, and means for electron conduction between fuel electrode and oxygen electrode external to such electrolyte.

Fuel cells employing a gaseous fuel, such as hydrogen gas, and diffusion electrodes designed to admit of a three-phase contact between the conducting electrode, a liquid electrolyte and fuel gas are both known to the art. In the operation of a fuel cell with vaporized fuel the removal of reaction products including the heat of reaction and chemical products, such as carbon dioxide and/or water, is necessary to maintain the fuel cell process in both temperature and material balance. The problems incurred in transporting and storing fuel for a fuel cell installation are appreciably reduced if such fuel is a liquid at the normal temperatures. Otherwise phrased, liquid fuel obviates the need for pressure equipment and/or refrigeration at this stage in the fueling process.

The overall fuel cell reaction is a combination of complementary half cell reactions. When a fuel cell is in operation and the electrolyte employed is basic, e.g. aqueous potassium hydroxide, electrons are supplied from the cathode to the oxygen-electrolyte interface on or in such electrode and negative ions are formed which migrate to the fuel-electrolyte interface on or in the anode where water is formed and electrons are given up to the surface of the anode. In a system employing an acid electrolyte, e.g. aqueous sulfuric acid, positive ions are formed with the oxidation of fuel at the anode interface with a release of electrons to such anode. The positive ions migrate to the vicinity of the cathode and upon transmittal of electrons by such cathode to the oxygen-electrolyte interface water of reaction is formed. In the oxidation of an organic fuel to completion carbon dioxide is formed and must eventually be removed from the cell to prevent choking of the reaction. Likewise, the continued production of water by the reaction necessitates the removal of such water because of space limitations and to avoid undue dilution of the electrolyte. Some form of heat removal is also necessary with an operating fuel cell system. However, if such system is to operate continuously and efficiently it must be maintained in operational balance. Thus, the methods adopted for the removal of heat, water and carbon dioxide must be mutually consistent with each other.

Heat of reaction may be removed from a fuel cell unit in a variety of ways. If the fuel cell employs an aqueous electrolyte, a portion or all of the heat may be removed by vaporizing water in the zone wherein the oxidizing gas is admitted to the cathode with the resulting vapors removed with the off gas. It is also possible to remove the heat of reaction by vaporizing water from the electrolyte compartment through the diffusion cathode into the flowing air stream. In cooperation with each such method the rate of air flow through the air feed space which communicates with the cathode may be varied.

It has now been discovered that a portion or all of the required heat removal from a fuel cell system may be effectuated while maintaining a balanced system by vaporizing a liquid fuel within the fueling zone which communicates with the anode. In a preferred embodiment, such removal is preferably effected by vaporizing an amount of such fuel in excess of the amount utilized by such cell as reactant and utilizing the excess vapor as a sweep gas to remove carbon dioxide and/or water from such zone.

Referring now to the accompanying drawings, FIGURES 1, 2, and 3 relate to apparatus which may be employed in the practice of this invention while FIGURE 4 illustrates physical properties of a desirable feedstock for use with this invention.

Figure 1:
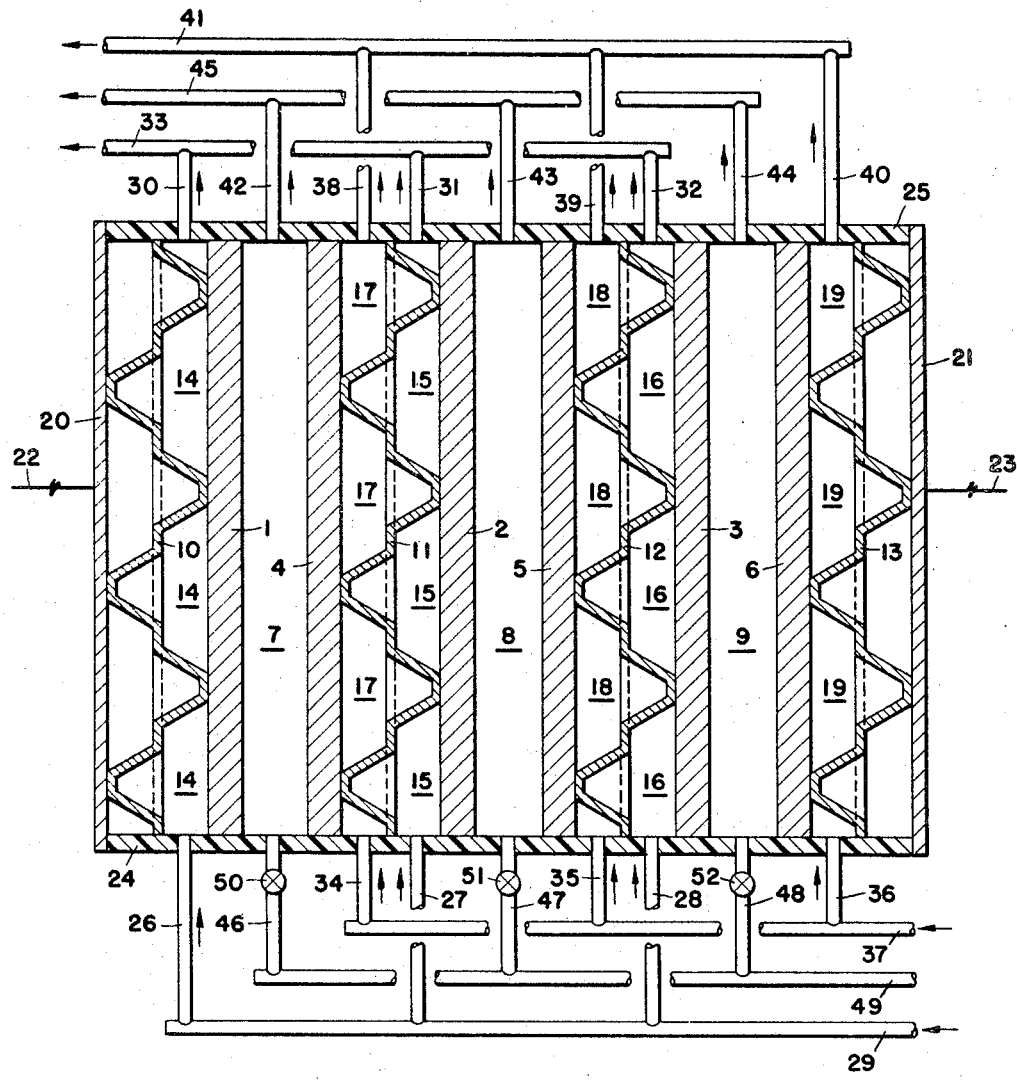
FIGURE 1 shows a schematic side view of a portion of a fuel cell pack wherein a group of fuel cells connected in series with inlet and outlet conduits may be respectively issuing from or converging to a common supply or evacuation chamber, not shown.

In FIGURE 1 a sectional side view of a bank of cells is connected in series, anodes 1, 2 and 3 are separated from cathodes 4, 5 and 6 respectively by electrolyte compartments 7, 8 and 9. Electrodes 1 through 6 inclusive may be conventional gas diffusion fuel cell electrodes. These may be of porous or gridlike metal construction of suitable mesh or porosity or of catalyst impregnated porous carbon. Ionic conductance is provided across electrolyte compartments 7, 8 and 9, which are supplied with a $CO_2$ rejecting electrolyte, preferably aqueous $H_2SO_4$ or a hydrated cation exchange membrane, preferably a homogeneous or interpolymer type cation exchange membrane having sulfonic acid groups as the dissociable ionizable radical. Electrode pairs are spaced part a distance no greater than ¼ inch and where an ion exchange membrane is employed as the electrolyte the distance will usually be less than 0.01 inch. Electron conduction between cells is provided by bipolar connector plates 10, 11, 12 and 13 which also extend parallel with the electrodes between opposing electrodes of adjacent cells so as to divide such space into fueling compartments 14, 15 and 16 and air compartments 17, 18 and 19. Plates 10, 11, 12 and 13 are of metal, e.g. stainless steel. Plates 10 and 13 are in electrical communication with terminal plates 20 and 21 through which electrical connection is established with an external electrical circuit shown only by lead wires 22 and 23. The other vertical walls of the compartments formed by the electrodes and bipolar connector plates and not shown here may be a single plate extending along the entire bank of cells with appropriately placed insulative materials to prevent internal electrical connection between electrodes or such walls may be formed entirely from a nonconductor. Above and below the electrodes of the cell pack insulators 24 and 25 provide support for the electrodes and means for maintaining their spacing. A liquid fuel is admitted to fueling compartments 14, 15 and 16 via fuel inlet conduits 26, 27 and 28 from a common supply conduit 29 in amounts in excess of that required to supply the fuel required to maintain the anodic half cell reaction at a predetermined level. Fuel entering compartments 14, 15 and 16 is vaporized therein. For obvious reasons the width of the fueling compartments will be as small as practicable to reduce overall space requirements and ordinarily will not exceed about ¼ inch although larger compartments may be used, if desired. The details of the fueling, vaporization, and removal of vapors are discussed elsewhere in this specification. Excess fuel vapors together with carbon dioxide and water vapors are passed from compartments 14, 15 and 16 via fuel exhaust conduits 30, 31, 32 and thence to 33 which eventually leads to a common recovery zone not shown. Air is passed into compartments 17, 18 and 19 via air inlet conduits 34, 35 and 36 from common air conduit 37 in amounts ordinarily 50 to 150% in excess of that stoichiometrically required to completely oxidize the fuel reacting. The quantity of fuel available for reaction is determined by the porosity of the anode and the pressure differential across it.. Excess air, nitrogen and water vapor is removed from compartments 17, 18 and 19 via air exhaust conduits 38, 39, 40 and thence to a common air exhaust conduit 41. Vapor conduits 42, 43 and 44 which connect with conduits 45 are provided above electrolyte compartments 7, 8 and 9 providing an additional means for release of water vapor. Electrolyte inlet conduits 46, 47, 48 and 49 with valves 50, 51 and 52 provide means for filling, draining or cleaning electrolyte compartments 7, 8 and 9.

Figure 2:
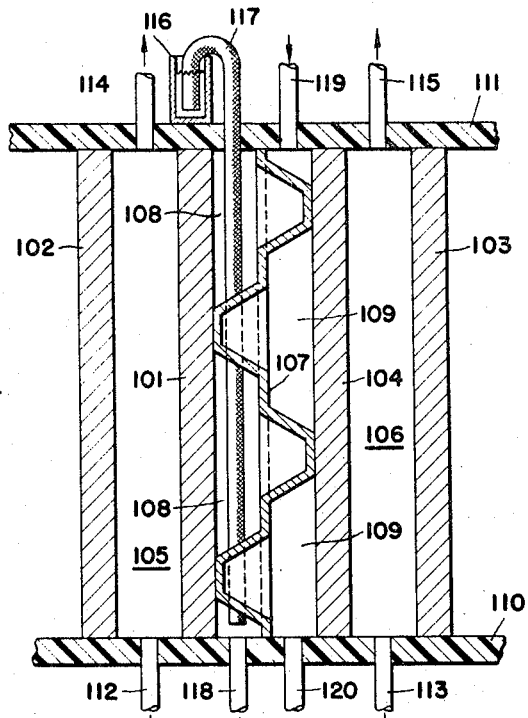
FIGURE 2 shows an enlarged schematic side view of two cells and a connecting zone therebetween divided by a bipolar connecting plate and utilizing wick means for admission of fuel.

In FIGURE 2, a magnified sectional view of two cells and connection zone therebetween, anodes 101 and 103 are separated from cathodes 102 and 104 respectively by electrolyte compartments 105 and 106 while the space between cathode 104 and anode 101 is divided by bipolar connector plate 107 into air compartment 109 and fuel compartment 108. The electrodes are spaced and supported by insulators 110 and 111 which serve to prevent direct electron conduction between electrodes of the same cell. Conduits 112 and 113 lead to electrolyte compartments 105 and 106 and serve the same function as conduits 46, 47 and 48 of FIGURE 1. Likewise, conduits 114 and 115 correspond with conduits 42, 43 and 44 of FIGURE 1. Positioned above insulator 111 is fuel feed conduit 116 which may serve a large number of such cells. Into conduit 116 is extended wick 117 so as to be immersed in liquid fuel while such fuel flows through conduit 116. Wick 117 may be made from any rugged fibrous or like material that is readily wet by the liquid fuel, e.g. cotton, carbon felt, etc. Wick 117 extends from conduit 116 into fuel compartments 108 where liquid fuel wicked into this compartment is vaporized. Unreacted fuel and reaction products of cell reaction are removed via fuel exhaust conduit 118. Air is admitted to compartment 109 via conduit 119 and exhausted via conduit 120.

Figure 3:
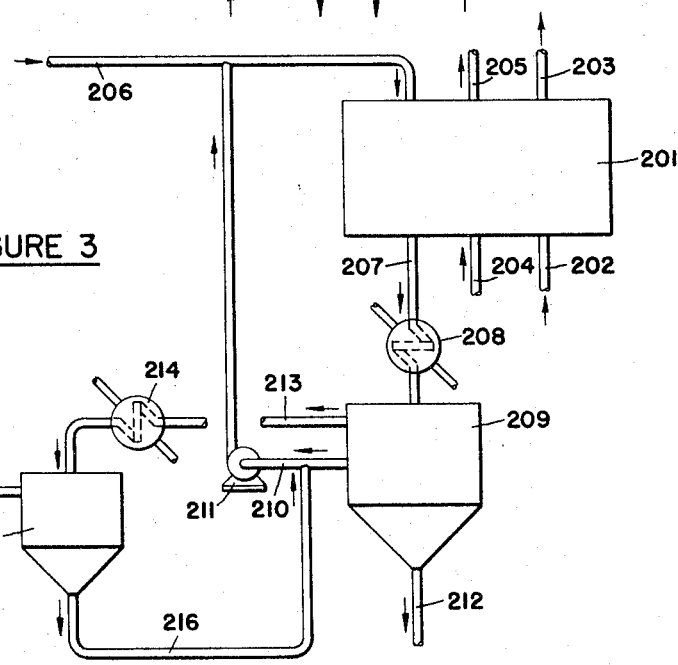
FIGURE 3 shows a schematic flow plan for utilization with a plurality of fuel cells operated in accordance with this invention wherein liquid fuel is introduced into such cells and a gaseous effluent removed therefrom.

In FIGURE 3, a schematic flow plan for power unit 201, a fuel cell installation is built up from a plurality of fuel cells connected in series and/or parallel to form a cell pack and a plurality of such cell packs connected in series and/or parallel. Connecting with unit 201 are shown six conduits 202, 203, 204, 205, 206 and 207. Conduit 202 represents a common air inlet conduit for the admission of air which feeds to the various cell packs of the installation and thence to the air compartments of the individual cells. Conduit 203 represents a common air outlet or exhaust to which the air exhaust conduits of each cell eventually leads. Conduit 204 represents a common electrolyte inlet conduit and 205 a common electrolyte outlet conduit. Conduit 206 is the common fueling conduit through which fuel is admitted for distribution to the individual cells as shown in FIGURES 1 and 2. Conduit 207 represents the common fuel exhaust unit from unit 201 through which excess fuel vapors, intermediate reaction products, carbon dioxide and water may be withdrawn from the unit. Conduit 207 passes through a first condenser 208 maintained at a temperature sufficiently low to condense most of the unreacted fuel components of the effluent, and thence to primary recovery vessel 209 where an upper organic layer and a lower aqueous layer will form. Condensed fuel may be withdrawn from an intermediate level of vessel 209 via conduit 210 and recycled to fuel inlet conduit 206 via pump 211. Water may be released from vessel 209 via conduit 212. Uncondensed vapors which may include intermediate reaction products in addition to vaporous feed and initiator gas employed to facilitate startup, carbon dioxide, etc. may be withdrawn from an upper level of vessel 209 via conduit 213, passed through a second condenser 214 which is maintained at a lower temperature than condenser 208 and thence to secondary recovery vessel 215. The liquid condensate deposited in vessel 215 may be recycled to unit 201 via conduits 216, 210 and 206. The remaining uncondensed material in vessel 215, mainly carbon dioxide, is released via conduit 217 from whence it may be exhausted to the air or passed to further recovery equipment not shown. Although the flow plan of FIGURE 3 is arranged in accordance with a fueling plan wherein the liquid fuel is admitted to the upper part of the power unit and thence to the upper part of each individual cell as shown in FIGURE 2, this design may be modified accordingly to provide a bottom feed to both unit and cell as shown in FIGURE 1.

In accordance with this invention it is preferred to employ a liquid organic fluid which is completely vaporizable at the temperature at which the fuel cell is to be operated, i.e. in the range of 100° F. to 300° F., preferably 150° F. to 225° F. The fuel should be a liquid at atmospheric pressure under normal operational and storage condition. However, it should be understood that under special conditions it may be advantageous to maintain the liquid fuel supply under a superatmospheric pressure and in such cases a lower boiling feedstock may be used.

The process of this invention may be advantageously carried out with liquid organic feedstocks comprising hydrocarbons or partially oxidized hydrocarbons, i.e. compounds consisting of carbon, hydrogen and oxygen, such as the aliphatic alcohols, aldehydes and carboxylic acids. Liquid hydrocarbons are particularly desirable in that they are relatively inexpensive and available in large quantities. A hydrocarbon feedstock that is particularly suitable for use in the process of this invention is a light naphtha consisting essentially of $C_5$ to $C_7$ hydrocarbons. Such feed may includes minor amounts of $C_3$, $C_4$ and $C_8$ hydrocarbons but when such fuel is to be handled at atmospheric pressure such minor amounts of $C_3$ and $C_4$ should not cause the vapor pressure of the liquid feed to exceed atmospheric pressure at the storage temperature. The $C_8$ concentration should be minimzed to avoid objectionable two-phase operation in the fuel cell. Because of the relative costs such hydrocarbons will ordinarily be composed primary of the hydrocarbons of the paraffin series but it should be undestood that naphthenes, olefins, and aromatics are also within the scope of this invention.

Figure 4:
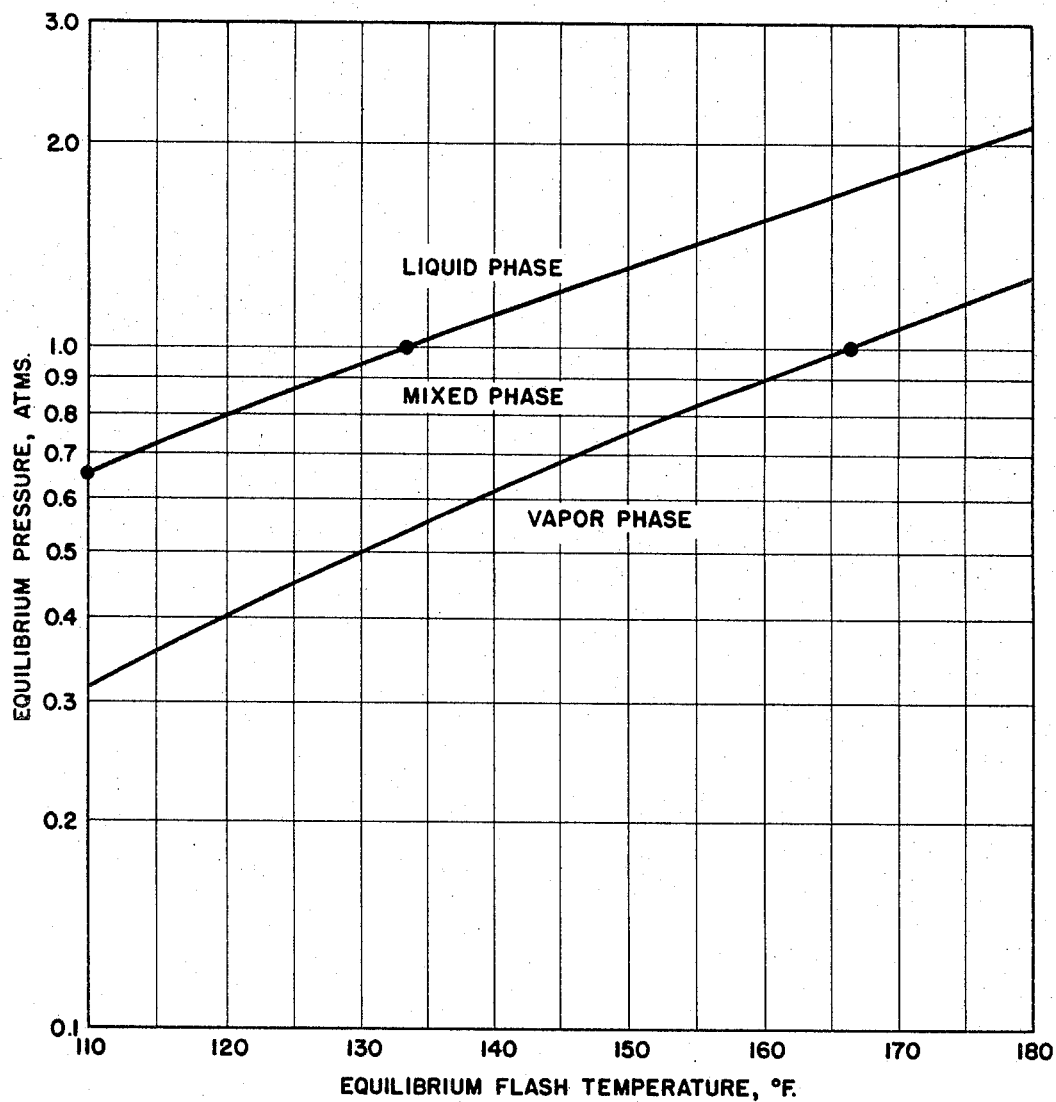
FIGURE 4 shows the phase changes of a characteristic fuel for use with this invention.

Some of the advantages of employing a light naphtha feedstock are illustrated by FIGURE 4 of the drawings. It may be noted from FIGURE 4 that a light naphtha composed of equal parts of n-pentane, n-hexane and n-heptane would have a vapor pressure of 0.65 at atmosphere at 110° F. The bubble point would be about 133° F. and all of the naphtha would be vaporized at about 167° F. Thus, this feed could be transported as a liquid and reacted as a gas in a fuel cell operating at 200° F.

The production of heat and other reaction products in a fuel installation, i.e. a multiplicity of cells connected in series and/or parallel, is best illustrated by referring to a specific fuel cell operation wherein the electromechanical efficiency, current density, voltage, fuel rate and composition and oxidant rate and composition are defined.

In the following table, conditions of fuel cell operation at different levels of productivity are set forth illustrating the resulting heat evolution and product formation.

TABLE I.—PRODUCT FORMATION IN CONTROLLED FUEL CELL OPERATIONS

| Fuel | | | | |
|---|---|---|---|---|
| Oxidant | \multicolumn{4}{c}{$N\text{-}C_6H_{14}$} |
| Effective anode surface, ft.$^2$ | \multicolumn{4}{c}{Air} |
| | \multicolumn{4}{c}{1} |
| Current density, amps./ft.$^2$ | 75 | 200 | 300 | 400 |
| Current withdrawal, amps | 75 | 200 | 300 | 400 |
| Volts, theoretical | 1.087 | 1.087 | 1.087 | 1.087 |
| Electrochemical efficiency, percent | 60 | 73.9 | 71.1 | 67.9 |
| Volts, actual at efficiency stated | 0.652 | 0.803 | 0.772 | 0.737 |
| Power, watts | 48.9 | 160.6 | 231.6 | 294.8 |
| Fuel rate: | | | | |
| Lbs./hr | 0.0139 | 0.0372 | 0.0557 | 0.0743 |
| Gms./hr | 6.3 | 16.9 | 25.3 | 33.7 |
| Air rate:[1] | | | | |
| Lbs./hr | 0.426 | 1.134 | 1.701 | 2.268 |
| Ft.$^3$/hr.$^2$ | 5.57 | 14.86 | 22.29 | 29.72 |
| Water formed: | | | | |
| Lbs./hr | 0.0205 | 0.0545 | 0.0818 | 0.109 |
| Gms./hr | 9.3 | 24.7 | 37.1 | 49.4 |
| $CO_2$ formed: | | | | |
| Lbs./hr | 0.0429 | 0.1142 | 0.1713 | 0.2284 |
| Ft.$^3$/hr.$^2$ | 0.370 | 0.99 | 1.479 | 1.97 |
| Heat release: | | | | |
| B.t.u./kwh | 2,150 | 1,080 | 1,260 | 1,500 |
| B.t.u./hr./cell | 105.1 | 173.4 | 291.8 | 442.2 |

[1] 100% in excess of that required for complete conversion of n-$C_6H_{14}$ to $CO_2$ and $H_2O$.
[2] At 60° F. and atmospheric pressure.

It will be noted from the foregoing that the heat release per cell per hour is substantial. For instance, at a current density of 300 amperes per square foot, 291.8 B.t.u./hr. would be released in each cell having an anode surface of one foot square. The heat release is a function of cell efficiency or delivered voltage. The 291.8 B.t.u. released per hour per cell corresponds to a voltage efficiency of 71.1% or a delivered voltage of 0.772 volt. The amounts of heat, carbon dioxide, and water release from n-hexane are typical of those obtainable with a $C_5$ to $C_7$ light naphtha. A major portion of the heat evolved may be removed in accordance with the process of this invention by vaporizing a controlled quantity of light naphtha in excess of that consumed in the fuel cell reaction. Where the electrolyte is a carbon dioxide rejecting electrolyte, e.g. acids or carbonates, the excess fuel vapors serve as a sweep gas to remove such product from the cell as such vapors exit the fueling compartment.

The utilization of fuel vaporization to effect cooling while maintaining a water balance in the system is illustrated in the following table. In the following example a fuel cell is maintained in heat and water balance at a constant current density under different temperatures of operation with an oxidant feed containing different concentrations of water vapor. In this operation the fuel employed is n-hexane, the oxidant is air and the electrolyte is 70% $H_2SO_4$ (aqueous).

TABLE II.—HEAT BALANCED FUEL CELL OPERATION

| | | |
|---|---|---|
| Current density, amps./ft.$^2$ | \multicolumn{2}{c}{300} |
| $H_2O$ in entering air, lbs./lb | 0.0 | 0.06 [1] |
| Electrolyte temperature, ° F | 195 | 225 |
| Fuel rate (reactant and excess for cooling): | | |
| Lb./hr | 1.346 | 1.205 |
| Mols/hr | 0.0156 | 0.0140 |
| Ft.$^3$/hr.$^2$ | 5.946 | 5.338 |
| Air rate:[3] | | |
| Ft.$^3$/hr.$^2$ | 22.29 | 22.29 |
| Lb./hr | 1.701 | 1.701 |
| Temperature of entering air and fuel, ° F | 100.00 | 100.00 |
| Water in entering air, ft.$^3$/hr.$^2$ | 0.0 | 2.15 |
| Water formed in reaction: | | |
| Lb./hr | 0.0818 | 0.0818 |
| Mols/hr | 0.00454 | 0.00454 |
| Ft.$^3$/hr.$^2$ | 1.725 | 1.725 |
| Total water rate | 1.725 | 3.875 |
| $CO_2$ formed: | | |
| Lb./hr | 0.1713 | 0.1713 |
| Mols/hr | 0.0039 | 0.0039 |
| Ft.$^3$/hr | 1.479 | 1.479 |
| Exit gas, oxidant stream, ft.$^3$/hr.:[2] | | |
| $N_2$ and $O_2$ | 19.95 | 19.95 |
| Water vapor | 1.27 | 2.915 |
| Exit gas, fuel stream, ft.$^3$/hr.:[2] | | |
| n-$C_6H_{14}$ | 5.70 | 5.092 |
| $CO_2$ | 1.479 | 1.479 |
| Water vapor | 0.455 | 0.960 |
| Coolant/reactant | 23.1 | 20.6 |
| Partial pressure of water vapor in exit gas streams, mm. of Hg (above 70% $H_2SO_4$) | 45.4 | 96.9 |
| Heat required to raise temperature of 1 lb. air from 100° F. to electrolyte temperature, B.t.u.-hr | 22.8 | 30.0 |
| Total heat removed by (1.701 lbs.) entering air, B.t.u./hr | 38.78 | 51.03 |
| Heat required to increase temperature of 1 lb. of n-hexane from 100° F. to 130° F. and to vaporize 1 lb. of -hexane at 130° F., B.t.u./hr | 161.0 | 161.0 |
| Heat required to raise temperature of 1 lb. of n-hexane gas from 130° F. to electrolyte temperature, B.t.u./hr | 27.0 | 39.0 |
| Total heat removed by fuel stream, B.t.u./hr | 253.02 | 240.77 |
| Total heat removal by air steam and fuel stream, B.t.u./hr | 291.8 | 291.8 |
| Total heat removal required, B.t.u./hr [4] | 291.8 | 291.8 |

[1] Air saturated with water at 110° F.
[2] At 60° F. and atmospheric pressure.
[3] 100% in excess of that required for complete conversion of n-$C_6H_{14}$ to $CO_2$ and $H_2O$.
[4] From Table I.

Thus, where the total heat removal requirement is 291.8 B.t.u./hr. for each cell, 38.78 B.t.u./hr. will be removed in heating the process air from 100° F to an electrolyte temperature of 195° F The remaining heat, 253.02 B.t.u./hr. is removed by feeding the cell 1.29 pounds of light naphtha in excess of that consumed to maintain a current density of 300 amps./ft.$^2$ of anode superficial surface. This naphtha stream, 1.346 lbs./hr., is heated from 100° F. to 130° F. as a liquid. At 130° F. the naphtha is vaporized, and then the vapors are heated from 130° F. to 195° F. Thus, to hold the cell in water balance, utilizing the feedstocks and feed rates above set forth with a 70% sulfuric acid electrolyte, requires an operating temperature of about 195° F. to 196° F. when the entering air contains no moisture. If, on the other hand, each pound of entering air contains 0.06 pounds of water vapor, the operating temperature necessary to maintain the cell in water balance would be about 225° F.

Slight modifications will be appropriate with a change in fuels, oxidants, feed rates, electrolyte composition and concentration. However, these adaptations may be easily calculated using the items set forth in Tables I and II and establishment of a given system will require no more than routine experimentation. A change from an n-hexane feed to equal volumes of n-pentaine, n-hexane and n-heptane will not require change. With an even volume mixture of n-pentane, n-hexane and n-heptane the 1.29 pounds of excess naphtha required each hour to remove the heat released in each cell at 195° F. would on vaporization yield 2.1432 ft.$^3$/hr. of n-pentane, 1.8810 ft.$^3$/hr.

of n-hexane and 1.6758 ft.³/hr. of n-heptane. Mixed with the hydrocarbon vapors leaving the cell would be 1.479 ft.³/hr. of $CO_2$ and 0.455 ft.³/hr. of water vapor. The foregoing volumes all represent measurement at 60° F. at atmospheric pressure. The effluent stream from the fueling compartment of a cell operated as in Table II with an evenly mixed $C_5$ to $C_7$ hydrocarbon feed would then have the following composition:

TABLE III

Effluent from fuel compartment of cell operated as in Table I while using even volumes of $C_5$, $C_6$ and $C_7$ n-paraffins at a temperature of 195° F.

| Component: | Mol percent |
|---|---|
| $CO_2$ | 19.37 |
| $H_2O$ | 5.95 |
| $C_5$ | 28.06 |
| $C_6$ | 24.67 |
| $C_7$ | 21.95 |
| Total | 100.00 |

In the method of removing heat from the cell by vaporization of excess fuel as above described, the product $CO_2$ in the cell is maintained below 20% by purging $CO_2$ from the cell with the excess hydrocarbon vapors.

The amount of excess fuel required for heat removal at a given voltage efficiency will be dependent upon the temperature of cell operation, i.e. electrolyte temperature, and the entering air stream temperature and moisture content. Table IV shows the excess fuel requirement (in terms of "Coolant/Reactant") for various operating conditions.

TABLE IV.—FUEL CELL PERFORMANCE DATA
[Fuel: Light naphtha typified by $nC_6$]

| Case | 1 | 2 | 3 | 4 | 5 | 6 | 7 | 8 | 9 | 10 | 11 | 12 |
|---|---|---|---|---|---|---|---|---|---|---|---|---|
| Voltage efficiency, percent | 30 | 30 | 30 | 60 | 60 | 60 | 60 | 60 | 60 | 80 | 80 | 80 |
| Current density, amps./ft.² | 75 | 75 | 75 | 75 | 75 | 75 | 75 | 75 | 200 | 75 | 75 | 75 |
| Temperature of Entering air, fuel, and coolant, °F | 100 | 100 | 20 | 100 | 100 | 20 | 100 | 100 | 100 | 100 | 100 | 20 |
| Mols water vapor in entering air/mol entering dry air | 0 | 0.064 | 0 | 0 | 0.064 | 0 | 0 | 0 | 0 | 0 | 0.064 | 0 |
| Temperature of 70% $H_2SO_4$ electrolyte, °F | 185 | 207 | 188 | 192 | 215 | 196 | 182 | 200 | 193 | 200 | 223 | 202 |
| Percent excess air | 100 | 100 | 100 | 100 | 100 | 100 | 200 | 50 | 100 | 100 | 100 | 100 |
| Coolant/reactant | 66.6 | 62.8 | 51.4 | 35.1 | 32.6 | 25.9 | 34.8 | 35.1 | 35.1 | 14.1 | 12.6 | 9.0 |

Generally a voltage efficiency in the range of about 30 to 80%, preferably about 60% is contemplated for the operation of fuel cells according to the present invention. As shown by Table IV the ratio of coolant to reactant is in the range of about 50–70/1 at a voltage efficiency of 30%; about 25–35/1 at a voltage efficiency of 60%; and about 10–15/1 at a voltage efficiency of 80%. Thus, maintaining a coolant to reactant ratio in the range of about 10–70/1 will satisfactorily heat balance a fuel cell operating according to the present invention.

The aforedescribed methods of cell operation wherein a liquid fuel is vaporized by absorption of the heat of reaction to effect vaporization, assumes an operating cell or a cell that has been preheated to initiate the reaction. It is within the purview of this invention to initiate the practice of the aforedescribed methods by introducing into the fueling compartment at startup a hydrocarbon more volatile than the regular feedstock. Such hydrocarbon should be a gas at starting temperature such as methane, ethane, ethylene, propane, propylene, or butane. Mixtures of two or more of these such as propane and butane may prove advantageous. Hydrogen may also be used.

This invention is therefore primarily directed to a method for maintaining a fuel cell in heat and material balance wherein a liquid fuel is introduced into the cell in excess of the reactant requirements of the cell, vaporized within the cell to absorb heat of reaction and provide a gaseous fuel to provide a sweep gas for the removal of chemical products of reaction and to a unique fueling device for carrying out the method described.

The term "oxygen electrode" has been used extensively in the fuel cell art as that electrode to which the oxidizing gas employed to effect the cathodic half cell reaction is admitted and hence is employed herein. The term "oxidizing gas," however, may include pure oxygen, oxygen mixed with other elements or compounds, mixtures of oxygen and carbon dioxide, air, etc., and in other embodiments, particularly where the production of chemical products is one facet of the fuel cell operation, may also include other oxidizing materials, e.g. the halogens such as chlorine and bromine. When air is employed as the oxidizing gas the nitrogen component normally does not enter into the fuel cell reaction and must be purged from the cell.

The terms "fluid" and "fluid fuel" as employed herein are limited to liquids, gases and combinations of the same.

What is claimed is:

1. In the method of operating a fuel cell comprising an anode, a cathode spaced apart from said anode, an electrolyte in contact with said anode and said cathode providing means for ionic transfer therebetween, conducting means for transfer of electrons from said anode to said cathode external to said electrolyte, transfer means for bringing an oxidizing gas selected from the group consisting of oxygen and air into dual contact with said cathode and said electrolyte, and a fueling compartment communicating with said anode wherein the chemical energy of a light naphtha hydrocarbon fraction boiling in the range of about 100° F. to 200° F. is converted to electrical energy by electrochemical oxidation at a temperature in the range of about 100° F. to 300° F., the improvement which comprises introducing into said fueling compartment a light naphtha hydrocarbon fraction which boils in the range of about 100° F. to 200° F., vaporizing said fraction at a predetermined operating temperature for said cell in an amount in excess of that required to maintain said operation at a predetermined level of electrochemical activity, the ratio of said excess to the fuel electrochemically reacted being in the range of about 10–70/1, and removing heat from said cell by withdrawing said excess from said fueling compartment in vaporous form.

2. A method as defined by claim 1 wherein said ratio varies inversely with the voltage efficiency of the fuel cell: ranging from 10–15 mols of coolant per mol of reactant at a fuel cell voltage efficiency of 80%, to 50–70 mols of coolant per mol of reactant at a fuel cell voltage efficiency of 30%.

3. A method as defined by claim 1 wherein the electrolyte temperature is maintained in the range of about 150° F. to 225° F.

4. A method as defined by claim 1 wherein said light naphtha hydrocarbon fraction consists of $C_5$ to $C_7$ hydrocarbons.

References Cited

UNITED STATES PATENTS

| 2,384,463 | 9/1945 | Gunn et al. | 136—86 |
| 3,061,658 | 10/1962 | Blackmer | 136—86 |
| 3,112,229 | 11/1963 | Bacon et al. | 136—86 |
| 3,116,169 | 12/1963 | Thompson | 136—86 |
| 3,160,528 | 12/1964 | Dengler et al. | 136—86 |
| 3,198,664 | 8/1965 | Kunz | 136—86 |
| 3,287,167 | 11/1966 | Weiss et al. | 136—86 |

ALLEN B. CURTIS, *Primary Examiner.*